(12) United States Patent
Ries-Mueller et al.

(10) Patent No.: US 6,702,086 B2
(45) Date of Patent: Mar. 9, 2004

(54) METHOD AND DEVICE FOR CONTROLLING AND/OR REGULATING THE SLIP OF A CLUTCH

(75) Inventors: Klaus Ries-Mueller, Bad Rappenau (DE); Peter Baeuerle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/172,412

(22) Filed: Jun. 14, 2002

(65) Prior Publication Data

US 2003/0015393 A1 Jan. 23, 2003

(30) Foreign Application Priority Data

Jun. 15, 2001 (DE) .......................................... 101 29 068

(51) Int. Cl.[7] .......................................... F16D 43/284
(52) U.S. Cl. .................... 192/103 F; 477/176
(58) Field of Search .................. 192/103 F; 701/67, 701/34; 477/176, 180, 906

(56) References Cited

U.S. PATENT DOCUMENTS

| | | | | |
|---|---|---|---|---|
| 4,457,411 A | * | 7/1984 | Hiramatsu | 477/176 |
| 4,606,446 A | * | 8/1986 | Watanabe | 192/103 R |
| 4,835,694 A | * | 5/1989 | Yamamoto et al. | 477/906 |
| 5,064,036 A | * | 11/1991 | Schneider | 192/103 F |
| 5,206,805 A | * | 4/1993 | Petzold et al. | 701/67 |
| 5,433,677 A | * | 7/1995 | Petersmann et al. | 192/103 F |
| 5,672,132 A | * | 9/1997 | Schwab | 192/103 F |
| 5,679,099 A | * | 10/1997 | Kato et al. | 477/176 |

* cited by examiner

Primary Examiner—Rodney H. Bonck
(74) Attorney, Agent, or Firm—Kenyon & Kenyon

(57) ABSTRACT

A method of controlling and/or regulating the slip of a clutch, for example, a clutch of a transmission, for example, a CVT transmission, is provided, the clutch including a driving element and an output element. The method measures at least one driving rotational speed and at least one output rotational speed for the controlling and/or regulating of the slip of the clutch, at least one driving rotational speed being measured when the clutch is closed, and at least one output rotational speed being measured when the clutch is closed; and the method determines a corrected driving rotational speed and/or a corrected output rotational speed for considering errors in the measured driving rotational speeds and in the measured output rotational speeds, by considering the at least one driving rotational speed measured when the clutch is closed and the at least one output rotational speed measured when the clutch is closed.

17 Claims, 3 Drawing Sheets

METHOD AND DEVICE FOR CONTROLLING AND/OR REGULATING THE SLIP OF A CLUTCH

FIELD OF THE INVENTION

The present invention relates to a method of controlling and/or regulating the slip of a clutch, for example, a clutch of a transmission, for example, of a CVT transmission having a driving element and an output element, measured driving rotational speeds and measured output rotational speeds being used to control and/or regulate the slip. In addition, the present invention relates to a device for controlling and/or regulating the slip of a clutch, for example, a clutch of a transmission, for example, of a CVT transmission, having a driving element and an output element, the device using measured driving rotational speeds and measured output rotational speeds to control and/or regulate the slip of the clutch.

BACKGROUND INFORMATION

Control and/or regulation of the slip of a clutch is understood to refer to control and/or regulation of the input rotational speed, i.e., the driving rotational speed and the output rotational speed, i.e., the driven rotational speed, so that a permanent deviation between the rotational speeds (equals slip) exists. Such a control and/or regulation of the slip of a clutch may be used with various types of clutches, such as torque converter lockup clutches, forward clutches and/or reverse clutches. When used with motor vehicles, the control and/or regulation of the slip of the clutch results in improvements in comfort and/or consumption, depending on the application. In addition, sudden changes in torque may be prevented by controlling and/or regulating the slip of the clutch.

CVT transmissions are continuously variable transmissions. Such transmissions may include, for example, two bevel gear pairs and a belt part (e.g., a steel thrust belt). One of the bevel gear pairs is connected to a drive, e.g., an internal combustion engine, while the other bevel gear pair is connected to an output. To adjust the gear ratio of the CVT transmission and the tension of the belt part, the driving bevel gear pair (i.e., the driving disk or primary disk) and the output bevel gear pair (i.e., the output disk or the secondary disk) each may include one axially stationary bevel gear and one axially movable bevel gear. In general, the axially movable bevel gears are pressed against the belt part by generating a hydraulic pressure, e.g., by a pump. The desired gear ratio of the CVT transmission and the required tension of the belt part may be adjusted through a suitable choice of the contact pressures. The pump for the hydraulic drive of the bevel gears may be driven by the combustion engine, for example. A torque converter and a planetary gear set having clutches for driving both forward and in reverse may be provided for the power transmission from the engine to the driving bevel gear pair. If the belt part twists or slips between the two bevel gear pairs, problems may occur, such as severe damage to or total destruction of the transmission, for example, by torque surges. To eliminate this problem, a clutch, for example, a slipping forward clutch, may be provided, for example, on the output side of the CVT transmission, i.e., between the output bevel gear pair and a driven axle. This may allow torque surges originating from a poor road surface to be attenuated. Thus, the belt part (e.g., a steel thrust belt), which may be destroyed by unattenuated torque surges, may be protected. To minimize the power loss of such a clutch, only a minor slip of, for example, five revolutions per minute, may be set. Thus, the difference in rotational speed between the driving side of the clutch, which is connected to the output bevel gear pair, and the output side of the clutch may be, for example, five revolutions per minute.

An accurate control and/or regulation of the slip of the clutch requires an accurate measurement of the rotational speed difference. For this purpose, the driving rotational speed and the output rotational speed of the clutch may be measured by rotational speed sensors. However, the accuracy of the rotational speed measurements may be limited, for example, due to tolerances of the sensors. Inaccurate rotational speed measurements have a negative effect on the quality of the control and/or regulation of the slip of the clutch.

SUMMARY OF THE INVENTION

An exemplary method according to the present invention for controlling and/or regulating the slip of a clutch provides that a corrected driving rotational speed and/or a corrected output rotational speed is determined to consider errors in the measured driving rotational speeds and/or the measured output rotational speeds. The determination of the corrected driving rotational speed and/or the corrected output rotational speed is considered, with at least one driving rotational speed measured when the clutch is closed and at least one output rotational speed measured when the clutch is closed. This method may, at least partially, compensate for errors that may occur during measurement of the driving rotational speed and output rotational speed, so that the difference between the driving rotational speed and the output rotational speed may, for example, be more accurately determined. This may permit an improved quality of control and/or regulation of the slip of the clutch.

Another exemplary method according to the present invention includes the steps of: (a) closing the clutch so that the actual driving rotational speed corresponds to the actual output rotational speed; (b) measuring at least one driving rotational speed and at least one output rotational speed; and (c) determining the difference between the measured driving rotational speed and the measured output rotational speed.

Closing the clutch, as recited, for example, in step (a), means that the clutch is operated without slip. In this manner, the actual driving rotational speed corresponds to the actual output rotational speed. The measurement performed in step (b), for example, may be subject to errors. However, these errors may be detected, for example, by determining, in step (c), the difference between the measured driving rotational speed and the measured output rotational speed (which would be zero in an error-free measurement).

Still another exemplary method according to the present invention includes the additional step of: (d) determining a differential function by recalculating the difference between the measured driving rotational speed and the measured output rotational speed to other rotational speeds.

Step (d) permits the information about measurement errors obtained by steps (a) through (c) to be applied to rotational speeds, for which steps (a) through (c) have not been performed.

In this regard, the differential function may be determined in accordance with a preselected characteristics map, which may show, for example, the measurement errors in revolutions per minute as a function of rotational speed.

In addition, or as an alternative, the differential function may be determined as a function of the measured driving rotational speeds and/or the measured output rotational speeds.

In this regard, the differential function may be determined as a function of the measured driving rotational speeds as follows:

$$f(nse)=nse*(nse1-nab1)/nse1,$$

in which nse is the measured driving rotational speed, nse1 is a driving rotational speed measured when the clutch is closed and nab1 is an output rotational speed measured when the clutch is closed. Such a differential function may be formulated, for example, when it is assumed that the driving differential nse1 has been measured correctly.

Yet another exemplary method according to the present invention includes the additional step of: (e) determining the corrected driving rotational speed and/or the corrected output rotational speed by adding the value of the differential function to the measured driving rotational speed and/or to the measured output rotational speed.

If the differential function is determined as a function of the measured driving rotational speeds, as described above, the corrected output rotational speed may be determined by adding the value of the differential function to the measured output rotational speed.

Still another exemplary method according to the present invention includes the additional step of: (f) forming the difference between a measured driving rotational speed and a corrected output rotational speed and/or forming the difference between a measured output rotational speed and a corrected driving rotational speed and using the difference to control and/or regulate the slip.

As described above, accurate determination of the rotational speed difference between the driving rotational speed and the output rotational speed of the clutch is essential for the quality of the control and/or regulation of the slip of the clutch. By determining this rotational speed difference according to step (f), measurement errors, which may occur during measurement of the driving rotational speed and the output rotational speed, may be at least partially compensated for, thereby producing improved results.

An exemplary device according to the present invention for controlling and/or regulating the slip of a clutch determines a corrected driving rotational speed and/or a corrected output rotational speed by considering at least one driving rotational speed measured when the clutch is closed and at least one output rotational speed measured when the clutch is closed, to consider errors in the measured driving rotational speeds and/or the measured output rotational speeds. This may permit errors in the measurement of the driving rotational speeds and/or output rotational speeds to be at least partially compensated for, so that the difference between the driving rotational speed and the output rotational speed, for example, may be more accurately determined. This may improve the quality of the control and/or regulation of the slip of the clutch.

Another exemplary device according to the present invention determines a difference between a driving rotational speed measured when the clutch is closed (i.e., the clutch is operating without slip) and an output rotational speed measured when the clutch is closed. In this manner, the actual driving rotational speed corresponds to the actual output rotational speed. However, the measurement of the driving rotational speed and the output rotational speed may be subject to errors. These errors may be detected by determining the difference between the measured driving rotational speed and the measured output rotational speed (which would be zero in the case of an error-free measurement, as described above).

Still another exemplary device according to the present invention determines a differential function by recalculating the difference between the measured driving rotational speed and the measured output rotational speed to other rotational speeds. In this manner, the information regarding measurement errors obtained through the measurements when the clutch is closed may also be applied to rotational speeds, for which no measurements have been performed with the clutch closed.

In this regard, the values of the differential function may be determined in accordance with a preselected characteristics map, which may show, for example, the measurement error in revolutions per minute as a function of rotational speed.

In addition or as an alternative, the differential function may be determined as a function of the measured driving rotational speeds and/or the measured output rotational speeds.

In this regard, the differential function may be determined as a function of the measured driving rotational speeds as follows:

$$f(nse)=nse*(nse1-nab1)/nse1,$$

in which nse is the measured driving rotational speed, nse1 is a driving rotational speed measured when the clutch is closed and nab1 is an output rotational speed measured when the clutch is closed. Such a differential function may be formulated, for example, when it is assumed that the driving rotational speed nse1 has been measured correctly, as described above.

Other exemplary devices according to the present invention determine the corrected driving rotational speeds and/or the corrected output rotational speeds by adding the value of the differential function to the measured driving rotational speeds and/or to the measured output rotational speeds. If the differential function is determined as a function of the measured driving rotational speeds, as described above, the corrected output rotational speed may be determined by adding the value of the differential function to the measured output rotational speed.

Yet another device according to the present invention forms the difference between a measured driving rotational speed and a corrected output rotational speed and/or the difference between a measured output rotational speed and a corrected driving rotational speed. This difference may then be used for controlling and/or regulating the slip. As described above, the accuracy in determining the rotational speed difference between the driving rotational speed and the output rotational speed of the slipping clutch is essential to the quality of the control and/or regulation. Through the determination of this rotational speed difference, errors in the measurement of the driving rotational speed and the output rotational speed may be at least partially compensated for, so that improved results may be achieved.

DETAILED DESCRIPTION

Figure 1:
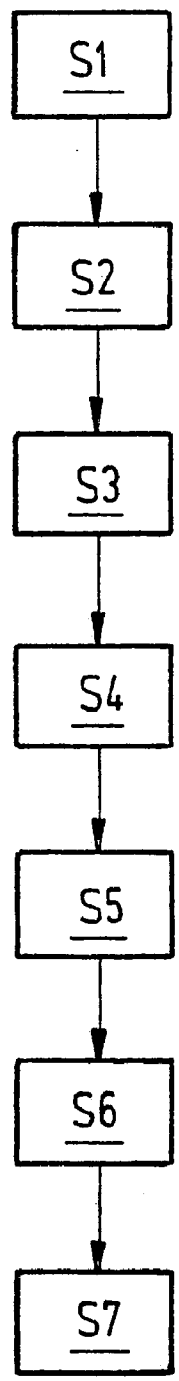
FIG. 1 is a flow chart of an exemplary method according to the present invention.

FIG. 1 is a flow chart of an exemplary method according to the present invention, including steps S1 through S7, the meaning of which are described in the following table:

| Step | Meaning |
| --- | --- |
| S1 | Start |
| S2 | Closing the clutch so that the actual driving rotational speeds corresponds to the actual output rotational speed |
| S3 | Measuring driving rotational speed nse1 and output rotational speed nab1 |
| S4 | Determining difference dn1 from measured driving rotational speed nse1 and measured output rotational speed nab1 |
| S5 | Determining a differential function dn by recalculating difference dn1 from measured driving rotational speed nse1 and measured output rotational speed nab1 to other rotational speeds |
| S6 | Determining a corrected output rotational speed nab_corr by adding the value of the differential function dn to the measured output rotational speed nab |
| S7 | Forming the difference between measured driving rotational speed nse and corrected output rotational speed nab_corr and using this difference to control and/or regulate the slip |

In step S1, clutch 10 is closed so that the actual driving rotational speed corresponds to the actual output rotational speed (i.e., so that there is no slip).

In step S2, driving rotational speed nse1 and output rotational speed nab1 are measured. Since the clutch is closed, thereby preventing slip, measured driving rotational speed nse1 should correspond to measured output rotational speed nab1. However, this may not result due to measurement errors, which may occur, for example, from sensors used to measure the rotational speed. The accuracy of such sensors may be, for example, 1.5%.

In step S4, the difference between measured driving rotational speed nse1 and measured output rotational speed nab1 is determined. The greater this difference, the more different may be the errors caused by the respective rotational speed sensors.

Figure 4:
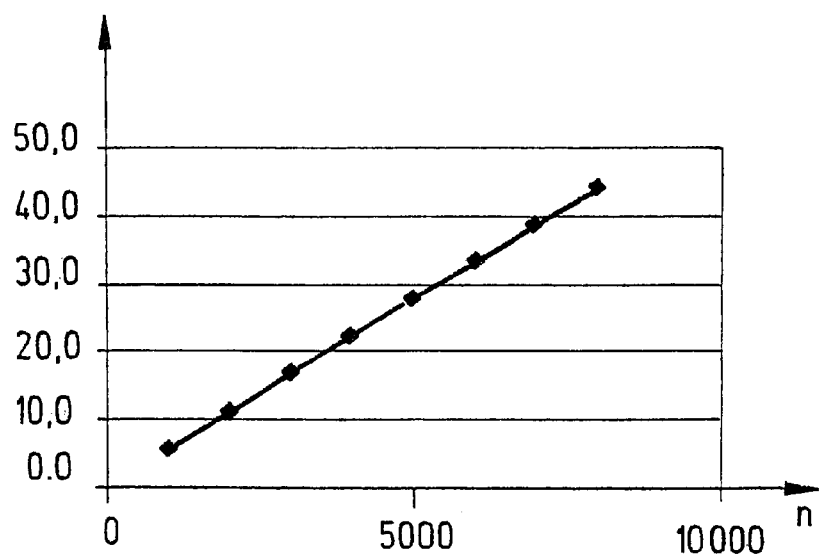
FIG. 4 is a graph of a characteristics map, which may be used for determining the differential function.

In step S5, a differential function dn is determined by converting difference dn1 to other rotational speeds. It may be sufficient to determine the difference or correction value dn1 at one rotational speed. The application or recalculation to other rotational speeds may be accomplished in accordance with, for example, characteristics maps, an example of which is shown in FIG. 4. However, a differential function dn may be determined as a function of, for example, measured driving rotational speeds nse, so that:

$$dn\text{-}f(nse)=nse*(nse1-nab1)/nse1,$$

in which nse corresponds to the instantaneous measured driving rotational speed, nse1 corresponds to the driving rotational speed measured when clutch 10 is closed and nab1 corresponds to the output rotational speed measured when clutch 10 is closed.

In step S6, a corrected output rotational speed nab_corr is determined by adding the value of the differential function dn and the value of measured instantaneous output rotational speed nab. The ratio of output rotational speed nab to corrected output rotational speed nab_corr is described in greater detail below with reference to FIG. 3.

In step S7, the difference between the instantaneous driving rotational speed nse measured instantaneously and a corrected output rotation speed nab_corr is determined. This difference (i.e., the corrected difference) is used in control and/or regulation of the slip, which may permit a more accurate control and/or regulation of the slip.

Figure 2:
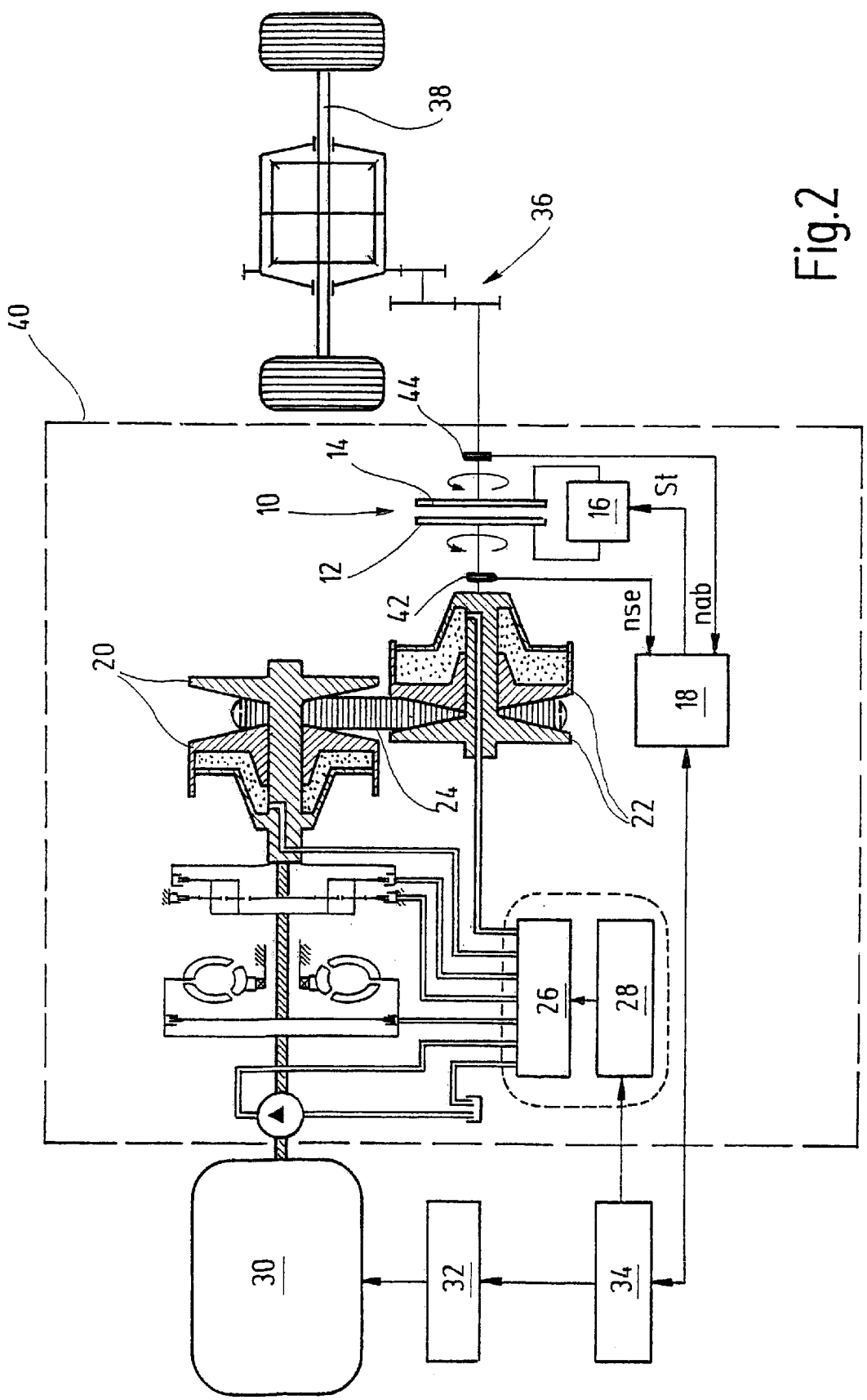
FIG. 2 is a diagram showing the interaction between an exemplary device according to the present invention and a clutch in a CVT transmission.

FIG. 2 shows the interaction between an exemplary device according to the present invention and a clutch of a CVT transmission. The CVT transmission 40 has two bevel gear pairs 20, 22 and a belt part designed as a sliding link belt 24. Bevel gear pair 20 (i.e., driving bevel gear pair 20) is connected to a drive, which is formed by an internal combustion engine 30. Bevel gear pair 22 (i.e., output bevel gear pair 22) is connected to a clutch 10, the slip of which is regulated and/or controlled according to the present invention. To adjust the gear ratio of CVT transmission 40 and the tension of sliding link belt 24, drive bevel gear pair 20 and output bevel gear pair 22 each consists of one axially stationary bevel gear and one axially movable bevel gear. The generation of a hydraulic pressure via a hydraulic system 26 produces a pressure of the axially movable bevel gears against the belt part. Hydraulic system 26 is driven by a hydraulic drive 28, which may be connected to an engine control or regulation 34. As shown in FIG. 2, engine control 34 controls actuators 32, which are assigned to engine 30. Clutch 10 has a driving element 12 connected to output bevel gear pair 22 and to an output element 14. Output element 14 is connected to a driven axle 38 of a vehicle via coupling devices 36. An actuator 16 acts on driving element 12 and/or output element 14 of clutch 10 to completely close or open clutch 10 or to influence the slip of clutch 10. Actuator 16 is controlled by an exemplary device 18 according to the present invention. Device 18 receives a driving rotational speed or a driving rotational speed signal nse, which is obtained from a first sensor 42. In addition, device 18 also receives an output rotational speed or an output rotational speed signal nab, which is obtained via a second sensor 44. The control and/or regulation of the slip of clutch 10 may be performed by device 18, for example, as described above with reference to with FIG. 1.

Figure 3:
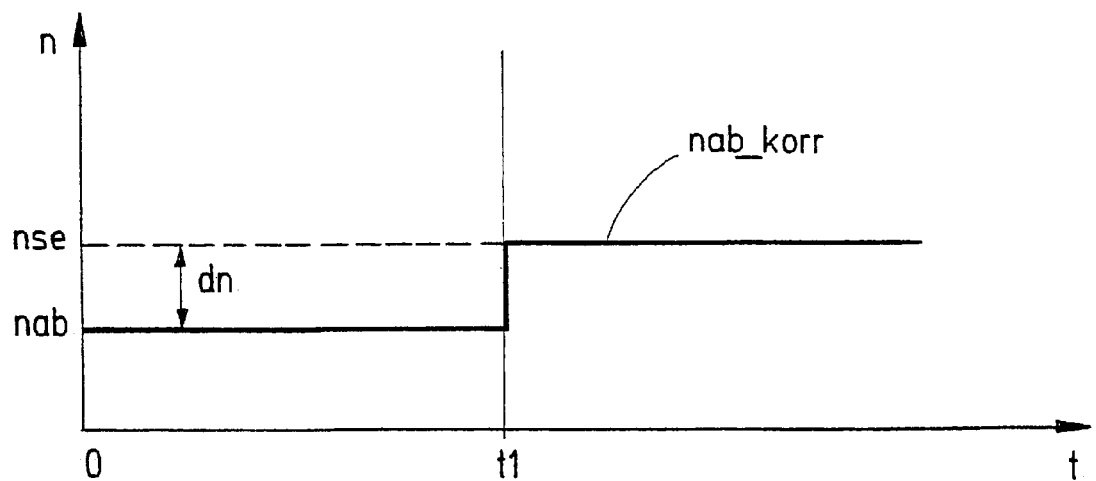
FIG. 3 is a graph of a driving rotational speed, an output rotational speed and a corrected output rotational speed as a function of time.

FIG. 3 is a graph of a driving rotational speed, an output rotational speed and a corrected output rotational speed as a function of time. The curves illustrated in FIG. 3 may be obtained, for example, when the clutch 10 is completely closed. As shown in FIG. 3, a difference dn is measured between driving rotational speed nse and output rotational speed nab in period of time 0–t1, although such a difference may not actually occur when clutch 10 is completely closed. After time t1, a corrected output rotational speed nab_corr is used. This value may be determined, for example, as described above with reference to FIG. 1. When clutch 10 is closed, corrected output rotational speed nab_corr corresponds to measured driving rotational speed nse, so that a corrected difference has a value of 0, which corresponds to the actual conditions.

FIG. 4 shows a characteristics map, which may be used to determine the value of a differential function. The error, in revolutions per minute for a rotational speed determination at a sensor wheel tolerance of 1° crankshaft angle, is plotted on the Y axis. The rotational speed is plotted on the X axis. The values of differential function dn in revolutions per minute may correspond, for example, to the points shown in FIG. 4.

Various exemplary embodiments according to the present invention may be used in conjunction with various slip-regulated clutches. In addition, rotational speed sensors may be diagnosed and/or equalized.

The various exemplary embodiments according to the present invention described above are presented for illustrative purposes only and as such, are not intended to restrict the scope of the present invention. Various changes and modifications may be effected within the scope of the present invention.

What is claimed is:

1. A method of at least one of controlling and regulating a slip of a clutch of a transmission, the clutch including a driving element and an output element, the method comprising:
    measuring at least one of a plurality of driving rotational speeds and at least one of a plurality of output rotational speeds for the controlling and regulating of the slip of the clutch, at least one of the driving rotational speeds being measured when the clutch is closed, and at least one of the output rotational speeds being measured when the clutch is closed; and
    determining at least one of a corrected driving rotational speed and a corrected output rotational speed to compensate for errors in the measured driving rotational speeds and in the measured output rotational speeds, wherein the determination is made based on the at least one driving rotational speed measured when the clutch is closed and the at least one output rotational speed measured when the clutch is closed.

2. The method according to claim 1, wherein the transmission includes a CVT transmission.

3. The method according to claim 1, wherein the step of determining includes forming a difference between the at least one driving rotational speed measured when the clutch is closed and the at least one output rotational speed measured when the clutch is closed.

4. The method according to claim 3, wherein the step of determining further includes determining a differential function by converting the difference between the at least one driving rotational speed measured when the clutch is closed and the at least one output rotational speed measured when the clutch is closed, to other rotational speeds.

5. The method according to claim 4, wherein the differential function is determined in accordance with a preselected characteristics map.

6. The method according to claim 4, wherein the differential function is determined as a function of the measured driving rotational speeds and the measured output rotational speeds.

7. The method according to claim 4, wherein the differential function is determined as a function of the measured driving rotational speeds in accordance with the equation: $f(nse)=nse*(nse1-nab1)/nse1$, wherein nse is one of the measured driving rotational speeds, nse 1 is one of the driving rotational speeds measured when the clutch is closed, and nab 1 is one of the output rotational speeds measured when the clutch is closed.

8. The method according to claim 4, wherein the step of determining further includes adding a value of the differential function to at least one of the following:
    (a) one of the measured driving rotational speeds, and
    (b) one of the measured output rotational speeds.

9. The method according to claim 1, further comprising:
    forming a difference between at least one of the following pairs of quantities:
        (a) one of the measured driving rotational speeds and the corrected output rotational speed; and
        (b) one of the measured output rotational speeds and the corrected driving rotational speed; and
    the using the difference for the at least one of controlling and regulating of slip.

10. A device for at least one of controlling and regulating a slip of a clutch of a transmission, the clutch including a driving element and an output element, comprising:
    a measuring arrangement for measuring at least one of a plurality of driving rotational speeds and at least one of a plurality of output rotational speeds for the controlling and regulating of the slip of the clutch, at least one of the driving rotational speeds being measured when the clutch is closed, and at least one of the output rotational speeds being measured when the clutch is closed; and
    a determining arrangement for determining at least one of a corrected driving rotational speed and a corrected output rotational speed to compensate for errors in the measured driving rotational speeds and in the measured output rotational speeds, wherein the determination is made based on the at least one driving rotational speed measured when the clutch is closed and the at least one output rotational speed measured when the clutch is closed.

11. The device according to claim 10, wherein the determining arrangement determines a difference between the at least one driving rotational speed measured when the clutch is closed and the at least one output rotational speed measured when the clutch is closed.

12. The device according to claim 11, wherein the determining arrangement determines a differential function by converting the difference between the at least one driving rotational speed measured when the clutch is closed and the at least one output rotational speed measured when the clutch is closed, to other rotational speeds.

13. The device according to claim 12, wherein the determining arrangement determines a value of the differential function in accordance with a preselected characteristics map.

14. The device according to claim 12, wherein the determining arrangement determines the differential function as a function of the measured driving rotational speeds and the measured output rotational speeds.

15. The device according to claim 12, wherein the determining arrangement determines the differential function as a function of the measured driving rotational speeds in accordance with the equation: $f(nse)=nse*(nse1-nab1)/nse1$, wherein nse is one of the measured driving rotational speeds, nse1 is one of the driving rotational speeds measured when the clutch is closed, and nab1 is one of the output rotational speeds measured when the clutch is closed.

16. The device according to claim 12, wherein the determining arrangement determines the corrected driving rotational speed and the corrected output rotational speed by adding a value of the differential function to the measured driving rotational speeds and the measured output rotational speeds.

17. The device according to claim 10, further comprising:
    a control arrangement, wherein the control arrangement forms a difference between at least one of the following pairs of quantities: (a) one of the measured driving rotational speeds and the corrected output rotational speed; and (b) one of the measured output rotational speeds and the corrected driving rotational speed; and wherein the control arrangement uses the difference for the at least one of controlling and regulating of the slip.

* * * * *

UNITED STATES PATENT AND TRADEMARK OFFICE
CERTIFICATE OF CORRECTION

PATENT NO. : 6,702,086 B2
DATED : March 9, 2004
INVENTOR(S) : Klaus Ries-Mueller et al.

It is certified that error appears in the above-identified patent and that said Letters Patent is hereby corrected as shown below:

Column 7,
Line 49, change "nse l" to -- nsel --.
Line 51, change "nab l" to -- nabl --.
Line 66, change "the using the difference" to -- using the difference --.
Line 67, change "and regulating of slip" to -- and regulating of the slip. --.

Signed and Sealed this

Fourth Day of January, 2005

JON W. DUDAS
*Director of the United States Patent and Trademark Office*